2 Sheets—Sheet 2.
F. G. KREUTZBERGER.
Grinding-Machine.
No. 203,741. Patented May 14, 1878.
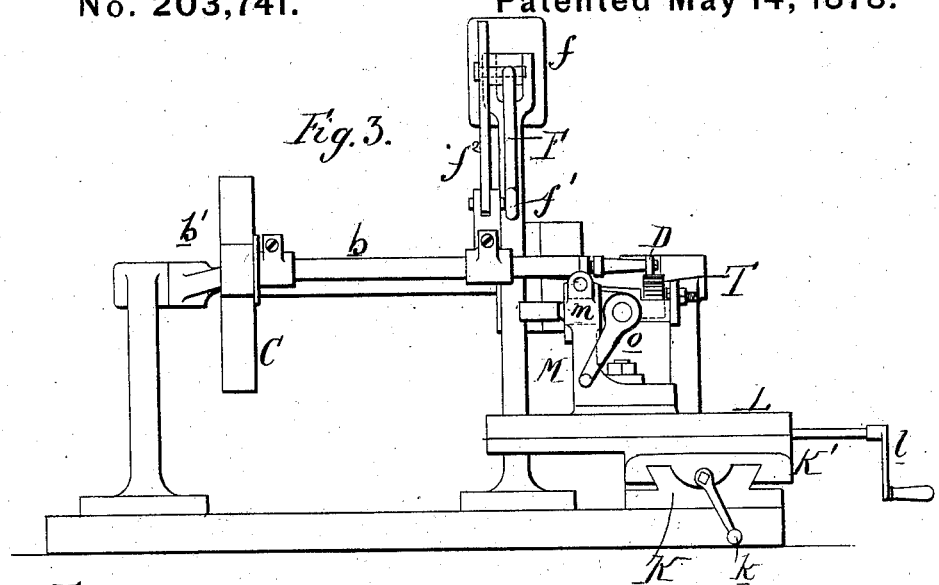
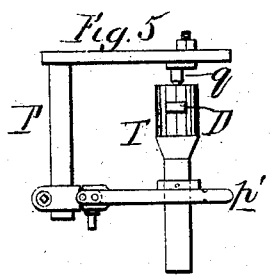
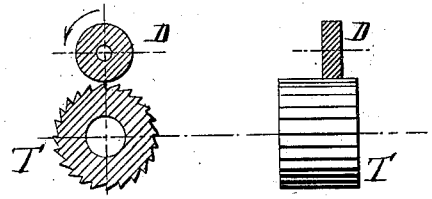
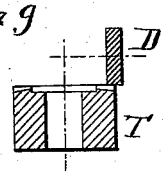
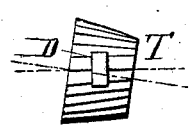
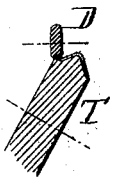
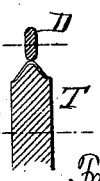
Witnesses
Thomas McIlvain
Harry Smith
Inventor
Frederic Guillaume Kreutzberger
by his Attorneys
Howson and Son

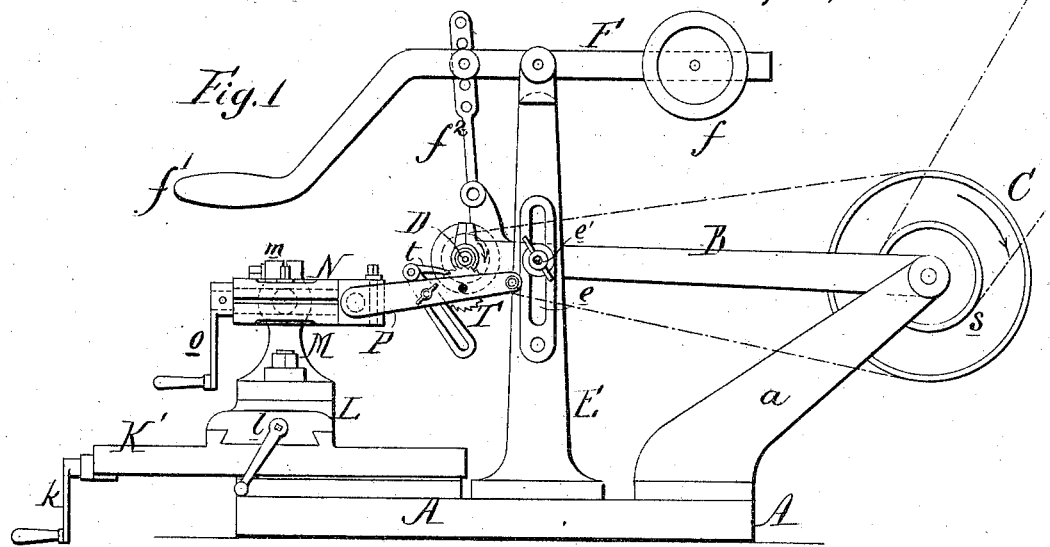
F. G. KREUTZBERGER.
Grinding-Machine.
No. 203,741. Patented May 14, 1878.

UNITED STATES PATENT OFFICE.

FREDERIC G. KREUTZBERGER, OF PARIS, FRANCE.

IMPROVEMENT IN GRINDING-MACHINES.

Specification forming part of Letters Patent No. 203,741, dated May 14, 1878; application filed January 2, 1878.

*To all whom it may concern:*

Be it known that I, FREDERIC GUILLAUME KREUTZBERGER, of Paris, France, have invented certain Improvements in Machines for Sharpening Cutting-Tools, of which the following is a specification:

The object of my invention is to construct a machine for sharpening rotary cutters, drills, countersinking, and other cutting tools, no matter what may be the form or shape of the cutting-edge of the tool; and this object I attain in the manner which I will now proceed to describe, reference being had to the accompanying drawings, in which—

Figure 1, Sheet 1, is a side view of the sharpening-machine; Fig. 2, a plan view, partly in section; Fig. 3, Sheet 2, a front view of the machine; Figs. 4 and 5, views of modified forms of the tool-holder; and Figs. 6 to 13, diagrams illustrating the positions of the grinding-wheel in respect to the different forms of cutters to be sharpened.

To the base A of the machine are secured the arms *a a*, having conical bearings for the driving-shaft S, which is provided with the usual fast and loose pulleys *s s'*. To the arms *a a* is also pivoted the frame B, which has at its outer end bearings for the shaft *b*, carrying the grinding-wheel D, this shaft being driven by a belt passing round the pulley *b'* from the pulley C on the driving-shaft, as shown by dotted lines in Fig. 1. To the base A is also secured the standard E, having a slot, *e*, through which and through an elongated opening in the side of the frame B passes a bolt, *e'*, provided with a nut, so that the outer end of the pivoted frame B, carrying the grinding-wheel shaft, may be raised or lowered, and secured after adjustment. To the upper end of the standard E is pivoted the lever F, provided at one end with a counter-weight, *f*, and at the opposite end with a handle, *f¹*. This lever is connected, by means of the rod *f²*, with the outer end of the frame B, so that, when the nut on the bolt *e'* is loosened, the frame B, and consequently the grinding-wheel, can be raised or lowered by the simple manipulation of the handle *f¹*. On that portion of the base of the machine over which the grinding-wheel projects are arranged dovetailed guides K for the carriage K', which is controlled by a feed-screw, *k*, as in an ordinary slide-rest. On this carriage K', and at right angles to the said guides, are arranged similar dovetailed guides for the slide L, which is controlled by a feed-screw, *l*. To this slide is secured, by means of a bolt and nut, a post, M, having at it head a split socket, *m*, through which passes a pin, *n*, on the split socket N. Through this socket N passes a bar, O, provided at one end with a handle, *o*, and at the other with a split socket, for the reception of an arm of the lever P, which carries the tool to be sharpened. Each of these split sockets is provided with a pressure-screw, for retaining their several pins, rods, or arms after the latter have been turned to their proper positions. By means of the movable slides K L and the split sockets and levers, the tool to be sharpened can be adjusted to any position in respect to the grinding-wheel that the contour of the cutting-teeth may demand.

The tool shown in the drawing as about to be sharpened is a rotary toothed cutter, through a central opening in which passes a bolt, secured to the lever P by suitable nuts. When the tool to be sharpened has a stem instead of a central opening, it may be secured to the lever P in the manner shown in Figs. 4 and 5. One end of the tool is then adapted to a pin, *q*, while the stem of the tool is grasped between a V-shaped recess in the arm *p* and the spring-arm *p'*.

The tendency of the grinding-wheel to turn the tool is obviated by a pawl, *t*, on an arm secured to the lever P, Fig. 1.

After the tool has been properly adjusted in respect to the grinding-wheel, the latter is put in operation, and the teeth of the tool sharpened to the required degree. If the tool T is a plain cylindrical-toothed cutter, as shown in Figs. 6 and 7, all that is necessary, after the tool has been adjusted and held by the pawl *t*, is to so manipulate the feed-screw *l* as to move the slide L and the tool-holding devices secured thereto horizontally the length of the tool while the grinding-wheel rotates in contact with each tooth.

When the cutter is of a tapering form, as shown in Fig. 8, or when the teeth are spiral, as shown in Fig. 10, or when the teeth are radial, as shown in Fig. 9, the sharpening is proceeded with in substantially the same manner, the axis of the tool having been first properly adjusted in respect to the axis of the grinding-wheel.

When the edge of the tool to be sharpened has a curved outline, as shown in Figs. 11, 12, and 13, the nut on the bolt $e'$ retaining the frame B is loosened, as is also the screw in the split socket N, so that the workman, by grasping the handle $f^1$ in one hand and the handle $o$ in the other, can so regulate the positions of the tool and grinding-wheel as to sharpen the edge of the tool to the desired outline.

I claim as my invention—

1. The combination of the pivoted frame, carrying the grinding-wheel, with a lever, F, and connecting-rod $f^2$, and an adjustable tool-holder, substantially as described.

2. The combination of the pivoted frame, carrying the grinding-wheel, with the slotted standard E and retaining devices, and with adjustable tool-holding mechanism, all substantially as specified.

In testimony whereof I have signed my name to this specification in the presence of two subscribing witnesses.

FREDERIC GUILLAUME KREUTZBERGER.

Witnesses:
AUGUST CHÉRNT,
JOSEPH DELAGE.